United States Patent
Vakrat et al.

(10) Patent No.: US 7,296,190 B2
(45) Date of Patent: *Nov. 13, 2007

(54) PARALLEL TEXT EXECUTION ON LOW-END EMULATORS AND DEVICES

(75) Inventors: Yaniv Vakrat, Ashdod (IL); Victor Rosenman, Tel-Aviv (IL)

(73) Assignee: Sun Microsystems, Inc., Santa Clara, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 10/767,850

(22) Filed: Jan. 29, 2004

(65) Prior Publication Data

US 2005/0005198 A1   Jan. 6, 2005

Related U.S. Application Data

(60) Provisional application No. 60/443,795, filed on Jan. 29, 2003.

(51) Int. Cl.
  *G06G 11/00*   (2006.01)
(52) U.S. Cl. ........................... 714/38; 717/124
(58) Field of Classification Search .................... 714/38
  See application file for complete search history.

(56) References Cited

U.S. PATENT DOCUMENTS

| | | | |
|---|---|---|---|
| 5,922,079 A | 7/1999 | Booth et al. | |
| 6,002,868 A | 12/1999 | Jenkins et al. | |
| 6,167,352 A | 12/2000 | Kanevsky et al. | |
| 6,219,829 B1 | 4/2001 | Sivakumar et al. | |
| 6,304,982 B1 * | 10/2001 | Mongan et al. | 714/38 |
| 6,311,149 B1 | 10/2001 | Ryan et al. | |
| 6,378,088 B1 | 4/2002 | Mongan | |
| 6,385,741 B1 | 5/2002 | Nakamura | |
| 6,393,591 B1 | 5/2002 | Edmondson et al. | |
| 6,397,378 B1 | 5/2002 | Grey et al. | |
| 6,449,731 B1 | 9/2002 | Frey, Jr. | |
| 6,560,721 B1 | 5/2003 | Boardman et al. | |
| 6,708,324 B1 * | 3/2004 | Solloway et al. | 717/124 |

(Continued)

OTHER PUBLICATIONS

Safari Books Online—http://proquest.safaribooksonline.com/print?xmlid=059600253x/j2meanut-chp-9-sect-1.*

(Continued)

*Primary Examiner*—Yolanda L Wilson
(74) *Attorney, Agent, or Firm*—Meyertons Hood Kivlin Kowert & Goetzel, P.C.; B. Noël Kivlin (57) ABSTRACT

A method for testing computing devices includes providing a suite of test programs on a server for execution by a plurality of the computing devices that are coupled to the server. A respective unique identifier is assigned to each of the plurality of the computing devices, for use in communicating with the server. The test programs are downloaded from the server for execution by the computing devices coupled thereto, so that at least first and second computing devices among the plurality execute different first and second test programs from the suite substantially simultaneously. The server receives messages from the computing devices with respect to execution of the test programs, each of the messages containing the respective unique identifier, and controls the execution of the test programs in the suite based on the messages.

20 Claims, 4 Drawing Sheets

U.S. PATENT DOCUMENTS

| | | |
|---|---|---|
| 6,839,647 B2 | 1/2005 | Volkov et al. |
| 6,847,916 B1 | 1/2005 | Ying |
| 6,868,508 B2 | 3/2005 | Grey |
| 2001/0054161 A1 | 12/2001 | Wooddruff |
| 2002/0133749 A1 | 9/2002 | Petersen et al. |
| 2003/0131285 A1* | 7/2003 | Beardsley et al. ............ 714/38 |
| 2004/0153774 A1* | 8/2004 | Gavish et al. ................ 714/25 |

OTHER PUBLICATIONS

U.S. Appl. No. 10/767,849, filed Jan. 29, 2004.
U.S. Appl. No. 10/767,845, filed Jan. 29, 2004.
U.S. Appl. No. 10/767,851, filed Jan. 29, 2004.
U.S. Appl. No. 10/767,848, filed Jan. 29, 2004.
U.S. Appl. No. 10/767,846, filed Jan. 29, 2004.

* cited by examiner

PARALLEL TEXT EXECUTION ON LOW-END EMULATORS AND DEVICES

CROSS-REFERENCE TO RELATED APPLICATIONS

This application claims the benefit of Provisional Application No. 60/443,795 filed Jan. 29, 2003. This application is related to application Ser. No. (10/767,849), entitled, Automated Test Execution Framework with Central Management.

BACKGROUND OF THE INVENTION

1. Field of the Invention

The present invention relates generally to hardware and software testing and verification, and specifically to testing software on low-end emulators and computing devices.

2. Description of the Related Art

The meanings of acronyms and certain terminology used herein are given in Table 1:

TABLE 1

| | |
|---|---|
| API | Application programming interface |
| CLDC | Connected, limited device configuration. CLDC is suitable for devices with 16/32-bit RISC/CISC microprocessors/controllers, having as little as 160 KB of total memory available. |
| HTTP | HyperText Transfer Protocol |
| ID | Identifier |
| IP | Internet Protocol |
| J2EE | Java 2 Enterprise Edition |
| J2ME | Java 2 Micro Edition |
| J2SE | Java 2 Standard Edition |
| JAD | Java application descriptor |
| JAM tags | Mandatory fields in a JAD file |
| JAR | Java archive |
| MIDlet | A MIDP application |
| MIDP | Mobile information device profile. A set of Java APIs, which, together with the CLDC, provides a complete J2ME application runtime environment targeted at mobile information devices. |

MIDP is defined in Mobile Information Device Profile (JSR-37), JCP Specification, Java 2 Platform, Micro Edition, 1.0a (Sun Microsystems Inc., Palo Alto, Calif., December 2000). MIDP builds on the Connected Limited Device Configuration (CLDC) of the Java 2 Platform, Micro Edition (J2ME) (available from Sun Microsystems Inc., Palo Alto, Calif.). The terms Sun, Sun Microsystems, Java, J2EE, J2ME, J2SE, and the Sun logo are trademarks or registered trademarks of Sun Microsystems, Inc., in the United States of America and other countries. All other company and product names may be trademarks of their respective companies. A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

Tools have been developed in recent years to aid in the design verification of hardware and software systems, for example software suites, hardware circuitry, and programmable logic designs. In order to assure that the design complies with its specifications, it is common to generate a large number of input or instruction sequences to assure that the design operates as intended under a wide variety of circumstances. In general, test systems produce a report indicating whether tests have been passed or failed, and, in some cases may even indicate a module that is estimated to be faulty.

Conventionally, to test a device under development (such as a mobile information device), or to test software designed to run on such a device, a developer connects the device to an appropriate test system. The target device under test may be connected to the test system either directly or via a communication emulator. The developer selects a battery of test programs to run on the target device while monitoring its behavior. Running the complete battery of tests can commonly take many hours or even days. This problem is particularly acute in testing low-end computing devices, such as cellular telephones and other mobile information devices, which have limited computing power and memory resources. Thus, testing on the target device can become a serious bottleneck in the development cycle.

SUMMARY OF THE INVENTION

Embodiments of the present invention provide methods and systems for parallel testing of multiple low-end computing devices, such as mobile information devices. Multiple computing devices are connected to a test server, either directly or via an emulator. Each of the devices is assigned a unique identifier (ID), which allows the server to keep track of which tests have been assigned to and carried out by each device. Whenever a device completes a test (or a bundle of tests), it reports the results to the server and requests the next text to execute, using its unique identifier in the messages that it sends to the server. Based on the unique identifier and the report, the server selects the next test or test bundle to assign to this device. This mechanism enables the server to balance and track the load of testing among an arbitrarily large number of client devices, and thus to complete the test suite in far less time than is required by test systems known in the art.

The invention provides a method for testing computing devices, which is carried out by providing a suite of test programs on a server for execution by a plurality of the computing devices that are coupled to the server, assigning a respective unique identifier to each of the plurality of the computing devices for use in communicating with the server, downloading the test programs from the server for execution by the computing devices coupled thereto, so that at least first and second computing devices among the plurality execute different first and second test programs from the suite substantially simultaneously. The method further includes receiving messages at the server from the computing devices with respect to the execution of the test programs, each of the messages containing the respective unique identifier, and controlling the execution of the first and second test programs in the suite based on the messages.

According to one aspect of the method, the computing devices are MIDP-compliant devices, and the test programs are MIDlets, which are packaged in respective JAD files and JAR files, and the method includes downloading the JAD files and the JAR files to the MIDP-compliant devices.

Yet another aspect of the method includes evaluating the JAD files, wherein the JAR files are downloaded responsively to the evaluation of the JAD files.

According to another aspect of the method, at the test program comprises a bundle of tests, and requests are received from the computing devices to determine a next test to execute in the bundle. Responsively to a selection at the server, based on the respective unique identifier contained in the requests, a determination is made of the next test to execute on each of the computing devices, and messages are sent from the server to the computing devices indicating the selection.

According to a further aspect of the method, the respective unique identifier of each of the computing devices includes an IP address.

According to yet another aspect of the method, assigning the respective unique identifier includes receiving an initial request from each of the computing devices to download one of the test programs, and assigning the respective unique identifier in response to the initial request.

According to still another aspect of the method, the computing devices are coupled to the server via a common test host, wherein an identifier of the common test host is shared by each of the computing devices in the respective unique identifier thereof.

The invention provides a computer software product, including a computer-readable medium in which computer program instructions are stored, which instructions, when read by a computer, cause the computer to perform a method for testing computing devices, which is carried out by providing a suite of test programs on a server for execution by a plurality of the computing devices that are coupled to the server, assigning a respective unique identifier to each of the plurality of the computing devices for use in communicating with the server, downloading the test programs from the server for execution by the computing devices coupled thereto, so that at least first and second computing devices among the plurality execute different first and second test programs from the suite substantially simultaneously. The method further includes receiving messages at the server from the computing devices with respect to the execution of the test programs, each of the messages containing the respective unique identifier, and controlling the execution of the first and second test programs in the suite based on the messages.

The invention provides a server for testing computing devices, including a communication interface for coupling a plurality of the computing devices thereto, such that a respective unique identifier is assigned to each of the plurality of the computing devices for use in communicating with the server via the communication interface. The server is adapted to provide a suite of test programs for execution by the computing devices that are coupled to the server, and to download the test programs via the communication interface for execution by the computing devices coupled thereto, so that at least first and second computing devices among the plurality execute different first and second test programs from the suite substantially simultaneously. The server is further adapted to receive messages via the communication interface from the computing devices with respect to execution of the test programs, the messages containing the respective unique identifier, and to control the execution of the test programs in the suite based on the messages and the respective unique identifier therein by communicating responses to the messages via the communication interface, wherein each of the responses is addressed to a respective one of the computing devices that is associated with the respective unique identifier.

According to an aspect of the server, the computing devices are coupled to the communication interface via a common test host, wherein an identifier of the common test host is shared by each of the computing devices, and the identifier of the common test host is included in the respective unique identifier thereof.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet.

Figure 1:
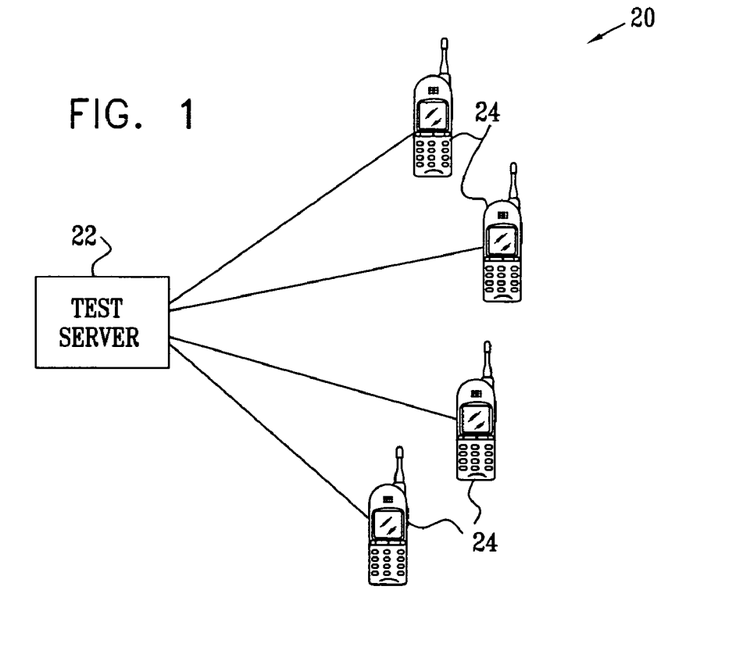
FIG. 1 is a block diagram that schematically illustrate systems for parallel testing of low-end computing devices, in accordance with an embodiment of the present invention.

Reference is now made to FIG. 1, which is a block diagram that schematically illustrates a system 20 for parallel testing of multiple mobile information devices 24, in accordance with an embodiment of the present invention. The system 20 is built around a test server 22, which is described in greater detail hereinbelow. The devices 24 are client devices, and are typically low-end devices, with limited computing power and memory, for example, cellular telephones or personal digital assistants (PDA's). In the description that follows, the devices 24 are assumed to comply with MIDP, but the principles of the present invention are equally applicable to other types of low-end computing devices, operating in accordance with other standards and specifications. The server 22 typically comprises a programmable processor, and has suitable communication interfaces, such as wireless or wired interfaces, for communicating with multiple devices 24 simultaneously.

Each of the devices 24 receives a unique identifier for communicating with the server 22. Typically, the unique identifier may comprise a unique Internet Protocol (IP) address that is assigned to each of the devices 24 for communicating with the server 22. Alternatively, the server may assign IDs of other types, or the ID's may be assigned by a user upon initiating communication between one or more of the devices 24 and the server 22. Methods for assigning and using these IDs are described in detail hereinbelow.

Figure 2:
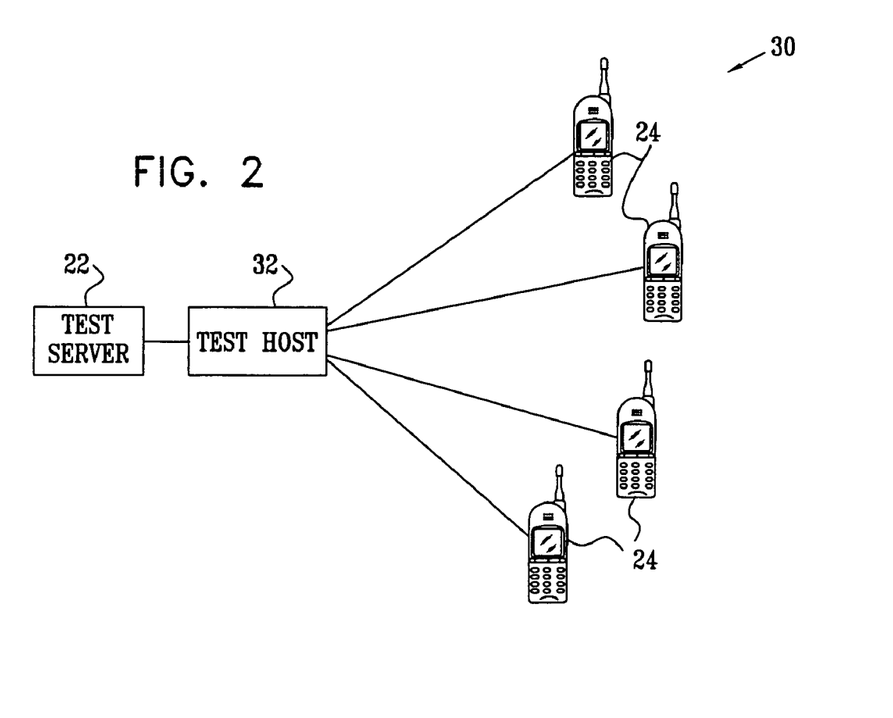
FIG. 2 is a block diagram that schematically illustrate systems for parallel testing of low-end computing devices, in accordance with an alternate embodiment of the present invention.

Reference is now made to FIG. 2, which is a block diagram that schematically illustrates a system 30 for parallel testing of multiple devices 24, in accordance with another embodiment of the present invention. In this embodiment, the server 22 communicates with the devices 24 through a test host 32, such as a personal computer or workstation. Multiple test hosts of this sort may be connected to the server 22 in parallel, but only a single host is shown in FIG. 2 for the sake of simplicity. The host 32 can simultaneously accommodate multiple devices 24, but the host 32 typically has only a single IP address. Therefore, in this embodiment, the IP address cannot be used conveniently to identify the individual devices 24, and an alternative unique identifier is typically used, as described below.

Figure 3:
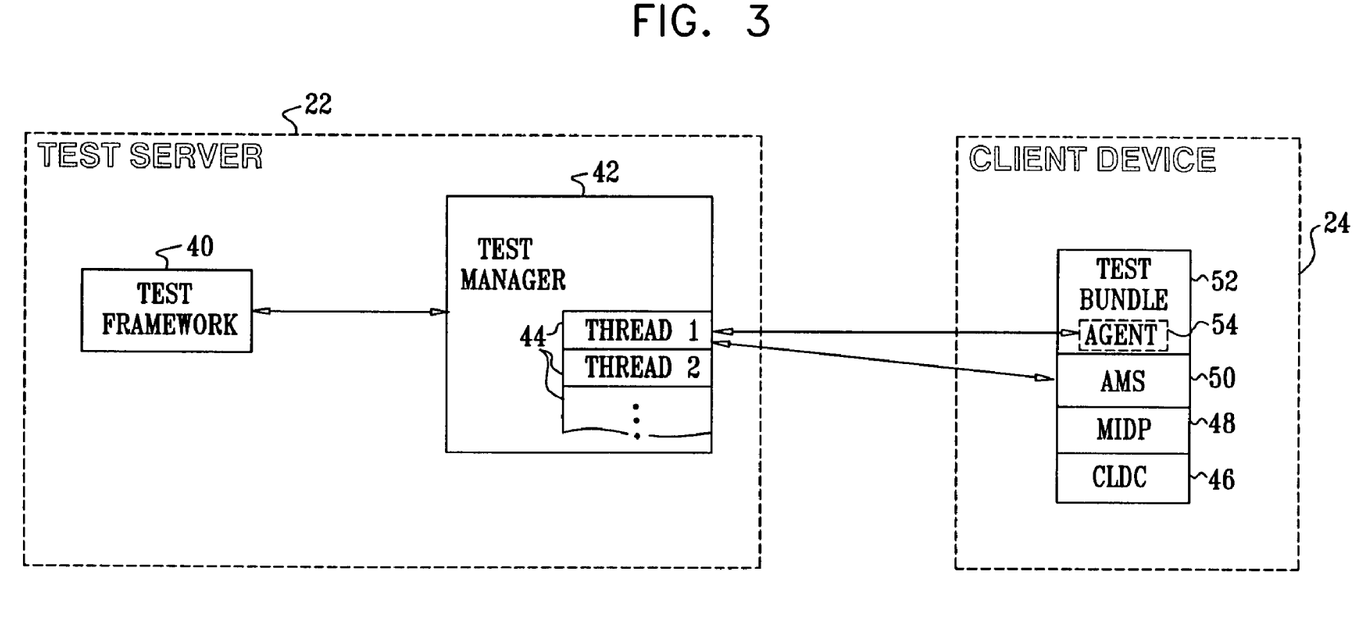
FIG. 3 is a block diagram that schematically illustrates program components used in a test system, in accordance with an embodiment of the present invention.

Reference is now made to FIG. 3, which is a block diagram that schematically illustrates software program components running on the server 22 and the devices 24, in accordance with an embodiment of the present invention. Elements of this software may be provided to the server 22 and to the devices 24 on tangible media, such as optical or magnetic storage media or semiconductor memory chips. The software may be downloaded to the server 22, and alternatively or additionally, to the devices 24 in electronic form, for example, over a network or over the air.

The server 22 comprises a test framework 40, which generates and deploys the tests to be carried out by the devices 24. The test framework 40 may be implemented as the "Java Device Test Suite" execution framework (JDTS) (version 1.0 or higher), available from Sun Microsystems, Inc., which employs MIDP. A suitable version of the test framework 40 is described, for example, in the above-mentioned application Ser. No. (10/767,849), which is commonly assigned herewith, and is herein incorporated by reference.

The tests typically are packaged in the form of Java applications contained in a set of JAD and JAR files. Each JAR file of this sort, together with its accompanying JAD file, is referred to hereinbelow as a test bundle 52. Users of the system 20 (FIG. 1) or the system 30 (FIG. 2) interact with the test framework 40 in order to select the tests to be executed by the system. Alternatively, other test frameworks may be used for generating the required test files, as will be apparent to those skilled in the art.

A test manager 42 in the server 22 is responsible for serving requests from the devices 24, based on the unique client identifiers mentioned above. Typically, whenever one of the devices 24 makes a request, the test manager 42, typically operating as a main thread, reads the request and assigns a new thread 44 to handle it. This thread 44 retrieves the client unique identifier from the request, calls the components of the test framework 40 that are needed to process the request, and then returns the appropriate response to the client device, as described hereinbelow. After assigning the thread 44 to handle the client, the main thread of the test manager 42 waits for the next client request. Each client request is handled by a separate thread 44, which terminates upon completion of processing. This arrangement, together with the unique identifier mechanism, ensures that the server 22 will be able to handle multiple devices 24 simultaneously without confusion.

In order to run Java applications, the devices 24 contain an implementation of the Connected Limited Device Configuration specification, CLDC 46, with an implementation of the Mobile Information Device Profile specification, MIDP 48, running over the CLDC 46. The applications that run on this technology, such as the tests supplied by framework 40, are known as MIDlets. These applications are created by extending an API MIDlet class of the MIDP 48. Thus, each test bundle 52 is actually a MIDlet, packaged in the form of a JAD/JAR file pair.

The test bundle 52 is typically downloaded to the devices 24 in a two-step process:

1. The server 22 downloads the JAD file, which contains environment settings and some environment demands. Application Manager Software, AMS 50, which is typically a part of a browser built into the devices 24, evaluates the JAD file to ensure that the device is able to accept the MIDlet. For example, the JAD file for a given MIDlet may specify that the device must support MIDP version 2.0. If the device does not support this version, the AMS 50 rejects the application download, and saves the time that would otherwise be consumed by downloading the much larger JAR file.
2. After completing all the relevant checks, the AMS 50 reads from the JAD file the location of the corresponding JAR file on the server 22 and asks to download the JAR file to one or more of the devices 24. The JAR file contains all the relevant classes of the test bundle 52.

Once the JAR file for the test bundle 52 is downloaded to one of the devices 24 and stored in the local device memory, the device is ready to run the tests of the test bundle 52. Every JAR file that the AMS 50 downloads to the devices 24 typically contains an agent 54, which is used to run the tests, in addition to classes corresponding to the tests themselves. To start test execution the AMS 50 runs the agent class. The agent 54 then addresses the server 22 in order to receive instructions regarding the next test to run (getNextTest) and to report test results (sendTestResult), typically using a protocol based on HTTP. Each test in the test bundle 52 corresponds to a respective class in the JAR file. Each client request that is addressed by the agent 54 to the server 22 includes the unique identifier that has been assigned to the particular one of the devices 24, so that the server 22 is able to recognize the client and serve it in the correct manner.

Implementation Details.

Further details of the implementation of the server 22 are given in Listing 1 (class BaseHttpServer). An implementation of the communications interface through which requests and messages are transmitted between the server 22 and the devices 24 is detailed in Listing 2 (class Communicator). Runtime generation of JAD files by the server 22 is accomplished using Listing 3 (class HttpServer). Launching of the agent 54 is detailed in Listing 4 (class MIDPRunner). Implementation of the thread 44 is detailed in Listing 5 (class ServerTaskThread).

Listing 6 shows a class (class Extender) that is needed by the classes shown in Listings 1-5. A brief description of Listing 6 follows.

A public interface Extender provides access to a class Extender. The class Extender enables an agent link with platforms that require extensions of their main application class, for example to properly employ a system class, such as class Applet or class MIDlet. The class Extender accepts delegation of platform specific commands from an agent.

The interface Extender includes the following methods. A method getRunnerExtender retrieves a reference to a platform class, which the main application class extends. Using this method, an agent provides access to the test program by the main application class in the context in which it is currently executing. An object is returned, which can be cast to the system class that the extender class extends. A method terminateAgent provides a platform-specific way of application termination.

It will be understood that Listings 1-6 are exemplary, and the functions and operations shown therein can be accomplished using other techniques known to the art.

Figure 5:
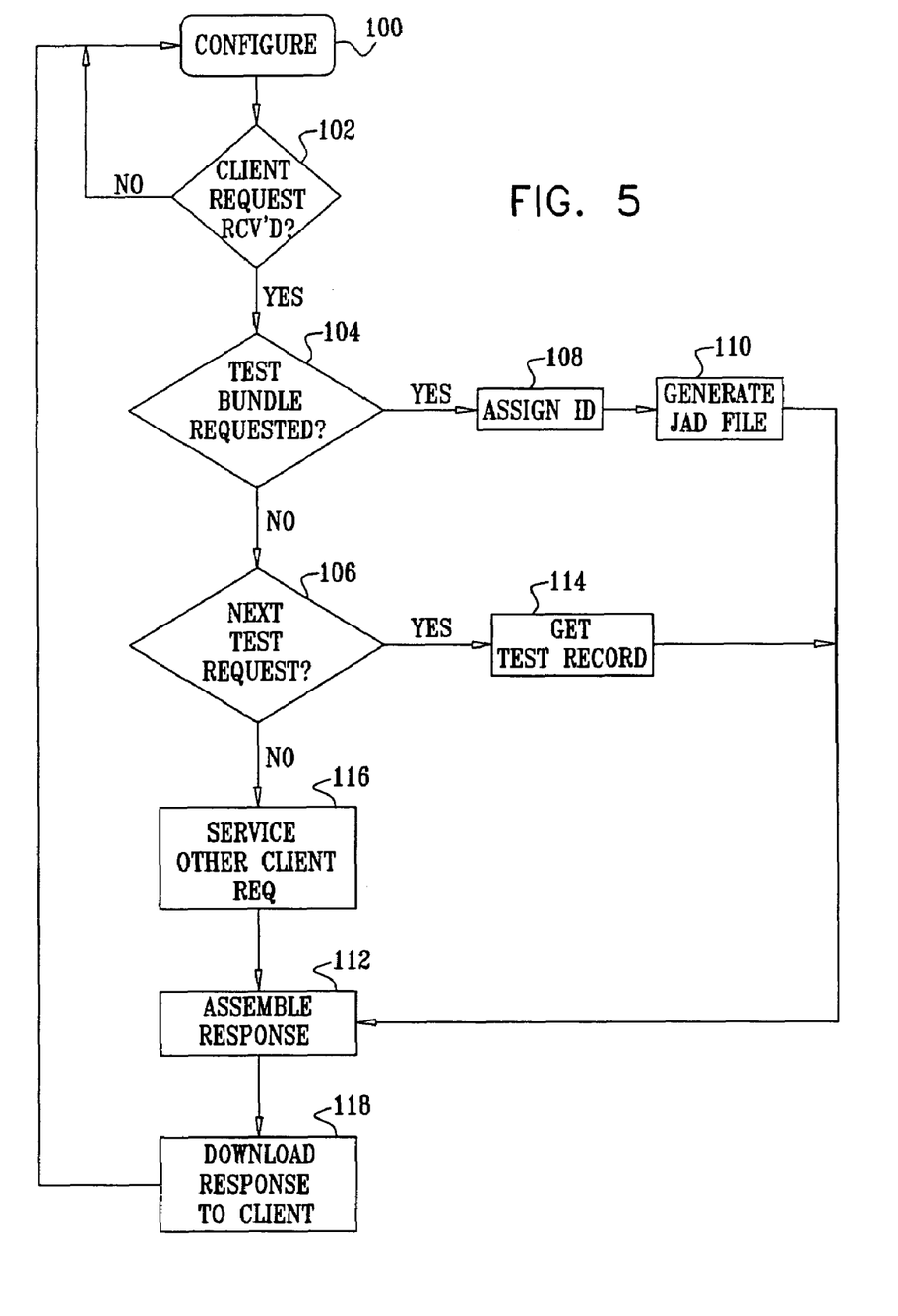
FIG. 5 is a flow chart that schematically illustrates a method for parallel testing of low-end computing devices, in accordance with an embodiment of the present invention.

Reference is now made to FIG. 5, which is a high level flow chart that schematically illustrates a method for running test suites on multiple client devices 24 in the system 20 (FIG. 1) or the system 30 (FIG. 2), in accordance with an embodiment of the present invention. The flow chart in FIG. 5 presents an interaction involving only a single client request for clarity. However, the method can be performed simultaneously, with many clients. Indeed, different devices may be executing different tests, or even different test suites or test bundles at any given time. This method is explained with reference to the software structures shown in FIG. 3, although other implementations are also possible, as will be apparent to those skilled in the art. The method begins at initial step 100, which is a configuration step. A server is attached to a plurality of client devices to be tested using suitable communications links.

Next, at delay step 102 the server awaits a request from a client. As will be apparent from the discussion below, the request could be for a new test bundle, or for the next test in a test bundle that is currently executing.

Upon receipt of a client request, control proceeds to decision step 104. Here it is determined whether the client request received at delay step 102 is a request for a new test bundle. This is normally the case when the client is first recognized by the server. Otherwise, such a request can occur if a previous test bundle has been completed by a client already known to the server according to its unique identifier.

If the determination at decision step 104 is negative, then generally, the server is already aware of the requesting client. Control proceeds to decision step 106, which is disclosed below.

If the determination at decision step 104 is affirmative, it is concluded that the server has not previously interacted with the requesting client. Control proceeds to step 108. Here a unique identifier is assigned to the requesting client. Whichever of the alternate methods disclosed herein for making the assignment is employed, the client is uniquely identified at step 108, and its subsequent requests and results will be handled without possibility of confusion with other currently attached clients. As noted above different clients may be identically configured, and may even be concurrently executing the same test bundle. Furthermore, any test results reported by the now uniquely identified client are accurately associated with that particular client so as to guarantee the integrity of test reports that may be eventually generated by the server. Control now proceeds to step 110.

At step 110 a JAD file corresponding to the client request is generated or selected by the server for transmission to the client. Control then proceeds to step 112, which is disclosed below.

Decision step 106 is performed when the determination at decision step 104 is negative. Here it is determined if the client request received at delay step 102 is a request for the next test to be executed in a current test bundle. Such requests may be generated at the client responsively to evaluation at the client of a previously downloaded JAD file, based on suitability of the tests for the particular client.

If the determination at decision step 106 is affirmative, then control proceeds to step 114. The server retrieves the test record that corresponds to the next test to be executed by the client. It will be apparent that this mechanism provides a high degree of central control by the server, so as to optimize the order of test execution by different clients. For example, if the server has received borderline test results from the client, it could elect to repeat a particular test, or to perform supplemental tests that would otherwise be skipped.

If the determination at decision step 106 is negative, then it is concluded that an unrelated client request has been made. For example, the client may have requested transmission of test results, or a display illustrating the profile of a test. Control proceeds to step 116, where this request is processed.

Next, at step 112 a response to the client request is assembled. Test information obtained in step 114, a JAD file obtained in step 110, or information relating to the request processed in step 116, whichever is applicable, is now concatenated with the client's unique identifier.

Next, at step 118, the response assembled at step 112 is downloaded to the requesting client. Control then returns to delay step 102, where the next client request is awaited.

Figure 4:
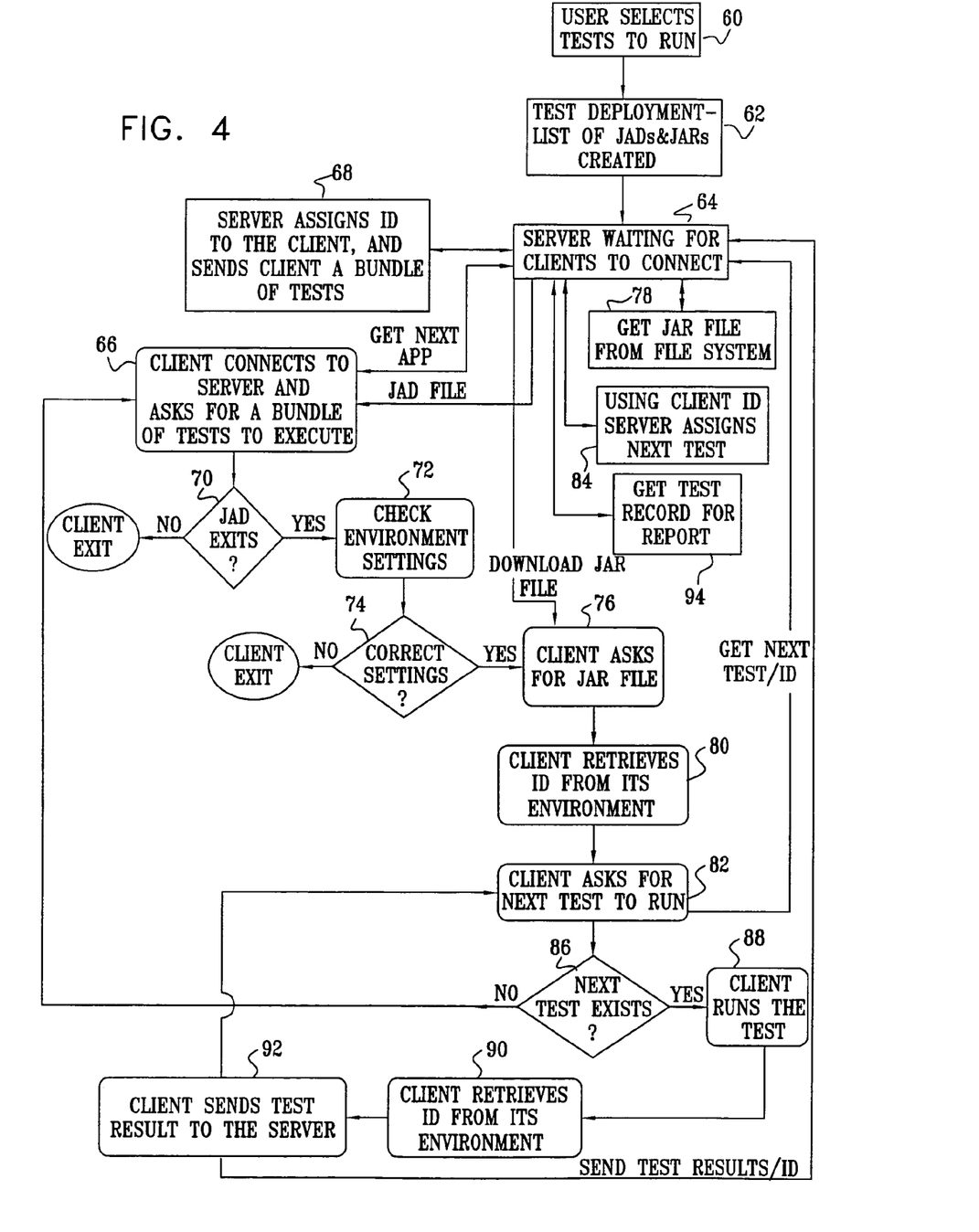
FIG. 4 is a detailed flow chart that schematically illustrates a method for parallel testing of low-end computing devices, in accordance with an embodiment of the present invention.

Reference is now made to FIG. 4, which is a detailed flow chart that schematically illustrates the method shown in FIG. 5 in further detail, in accordance with an embodiment of the present invention. The method begins with selection of the tests to be run, at a test selection step 60. This step is generally performed by a user, such as a development engineer, through interaction with the framework 40. Based on the user selections, the framework 40 deploys the selected tests, at a deployment step 62. At this step, the test framework creates a list of test bundles 52 (JAD/JAR file pairs), which also include the agent 54, as described above. When the deployment phase is completed, bundles 52 are ready to be downloaded to the devices 24, and the server 22 waits for the devices 24 to connect at a server waiting step 64.

Each of the devices 24 that is linked to the server 22 makes an initial connection with the server 22 and requests a test bundle 52, at a bundle request step 66. The syntax for this initial request is typically:
http://<server_name>:<server_port>/getNextApp.jad.

Every time one of the devices 24 addresses the server 22 at step 66, the server assigns the device a unique identifier. The server 22 then sends a JAD file to the client device containing the unique identifier, along with other information regarding the test bundle 52, at a JAD download step 68. Typically, the server 22 marks the associated JAR file as "in use," to ensure that the same test bundle is not inadvertently assigned to two devices 24. The AMS 50 stores the unique identifier in the local memory of the appropriate one of the devices 24. Thereafter, each time this device addresses the server, it retrieves the unique identifier from its memory and concatenates the unique identifier to the request in order to request the next test to perform, for example as follows:
http://<server_name>:<server_port>/getNextTest/<ID>.

If each of the devices 24 that is linked to the server 22 has a unique IP address, this IP address may be used by the server 22 as the unique identifier for the respective device.

When the devices 24 communicate with the server 22 using HTTP, one of the client request parameters is simply the IP source address, so that the unique identifier is naturally contained in every request.

Alternatively, in some cases, such as the system 30 (FIG. 2), multiple devices 24 may use the same IP address in communicating with the server 22. Thus, upon receiving the initial client request at step 66, the server 22 may recognize that the IP source address is already in use as a unique identifier by another one of the devices 24. In this case, the test manager 42 creates a new unique identifier for the current client device, typically by concatenating the client's IP address with a sequential number, to which the server 22 has access, and which is inaccessible to network elements other than the server 22 and the devices 24.

Further alternatively, an outside ID manager (not shown) may be used to assign client unique identifiers, either automatically or under control of the user. Thus, for example, if the initial connection request issued by one of the devices 24 has the form:

http://<server_name>:<server_port>/getNextApp, the request is extended by the ID manager to be http://<server_name>:<server_port>/getNextApp/1. The next connection request, by another client device, is extended to be http://<server_name>:<server_port>/getNextApp/2; and so on. The server 22 assumes that the outside ID manager is reliable, and assigns to each of the devices 24 a respective unique identifier that is appended to the first request from the device.

In deciding which JAD file to send at step 68, the server 22 consults a list of test bundles created at step 62 to determine which test bundles have not yet been assigned. It may parcel out the different test bundles among different devices 24 in such a way that the testing load is balanced among the devices, and all the devices 24 therefore complete their respective shares of the test suite at approximately the same time. The load balancing is done according to a controlling policy, which is not necessarily according to execution time of the different test bundles or components of the test bundles. The test manager 42 may also take into account sequential testing relationships among the test bundles, for example, that a test bundle B should be carried out only by a client device that has successfully passed the tests in a test bundle A. On the other hand, the server 22 may decide at step 68 not to send any test bundle to the client device in question, for example because there are no more test bundles to execute. If a client device does not receive a JAD file after submitting its request at step 66, the device exits from the test program, at a client termination step 70.

Assuming one of the devices 24 receives a JAD file, however, the AMS 50 checks the environment settings in the JAD file, at an environment checking step 72. The AMS may determine that the MIDP 48 or the CLDC 46 or other resources of the device, such as memory or display capacity, are incompatible with the environment settings required for the test bundle 52, at an environment rejection step 74. In this case, as well, the client device exits, after notifying the user of system 20 that the settings are incorrect, and test execution stops.

Once the AMS 50 has determined that one of the devices 24 is able to carry out the test bundle indicated by the JAD file, it asks the test manager 42 to download the corresponding JAR file, at a JAR request step 76. The location of the JAR file on the server 22 is provided by the JAD file, and this location is invoked by the AMS 50 in requesting the JAR file. The test manager 42 reads the JAR file from the test framework 40 and downloads it to the device at a JAR download step 78. The AMS 50 stores the JAR file in the local memory of device and runs the class of the agent 54 to begin the tests in the test bundle 52.

When the agent 54 is invoked in this manner, it retrieves the unique identifier of one of the devices 24 from the local memory of the device, at a first unique identifier retrieval step 80. It will be recalled that the unique identifier was passed from the server 22 to the device in the JAD file downloaded at step 68. The agent 54 uses this unique identifier in asking the server 22 for the name of the next test to be run, at a next test request step 82. This request has the general form:

http://<server_name>:<server_port>/getNextTest/<ID>.

The server 22 uses the unique identifier to determine the next test to be run in the bundle currently assigned to this client device. The server 22 returns the name of the next test—actually the class name of the desired test in the current test bundle 52—to the client device, at a next test determination step 84.

Upon receiving the reply from the server 22, the agent 54 ascertains that the reply has named one of the classes in the present test bundle, at a next test checking step 86. If so, the agent runs the class named by the server 22 at a test execution step 88. Upon completing the test corresponding to the named class, the agent 54 prepares to report the test results to the server 22. For this purpose, the agent 54 again reads the unique identifier of the device, at a second unique identifier retrieval step 90. It uses this unique identifier in reporting the test results to the server 22, at a result reporting step 92, in the general form:

http://<server_name>:<server_port>/sendTestResults/<ID>.

The server 22 receives the test record from the device, and adds the record to a test report, at a test recording step 94. This report is later submitted to the user of the test system upon completion of the test suite, or upon demand by the user. The agent 54 then returns to step 82 to request the next test to run.

On the other hand, the server 22 may determine at step 84 that there are no more tests to run in the current test bundle. In this case, at step 86, the agent 54 is informed that the test bundle has been completed. The agent 54 returns control to the AMS 50, which then asks the server 22 for the next bundle of tests to be executed, at step 66. This process continues until the entire test suite specified at step 60 is completed, unless the server 22 exits earlier due to a system error.

Although the embodiments described hereinabove are based on the Java programming language and Java-related conventions, as well as on certain specific protocols and device specifications, such as CLDC and MIDP, the principles of the present invention may similarly be applied to low-end computing devices using other languages, conventions, protocols and specifications. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof, which-would occur to persons skilled in the art upon reading the foregoing description and which are not disclosed in the prior art.

The invention claimed is:

1. A method for testing computing devices, the method comprising:

providing a suite of test programs on a server for execution by a plurality of said computing devices that are coupled to said server;

receiving requests at said server from said computing devices requesting said server to provide test programs to said computing devices;

assigning a respective unique identifier to each of said computing devices, for use in communicating with said server;

downloading said test programs from said server for execution by said computing devices coupled thereto, so that at least first and second computing devices among said plurality execute different first and second test programs from said suite substantially simultaneously;

receiving requests at said server from said computing devices with respect to said execution of said test programs to determine a next test to execute at each of the computing devices, wherein each of said requests contains said respective unique identifier; and controlling said execution of at least said first and second test programs in said suite.

2. The method according to claim 1, wherein said computing devices comprise MIDP-compliant devices, and wherein said test programs comprise MIDlets, which are packaged in respective JAD files and JAR files, and wherein allocating said test programs comprises downloading said JAD files and said JAR files to said MIDP-compliant devices.

3. The method according to claim 2, further comprising the step of evaluating said JAD files, wherein said JAR files are downloaded responsively to said step of evaluating said JAD files.

4. The method according to claim 1, wherein said controlling the execution of said test programs comprises making a selection at said server, based on said respective unique identifier contained in said requests, of said next test to execute on each of said computing devices, and sending responses to said computing devices indicating said selection.

5. The method according to claim 1, wherein each of at least a subset of said test programs comprises a bundle of tests, the method further comprising:

determining for each of the requests received at said server from said computing devices whether a received request is a request for the server to determine a new test bundle or a request for the server to determine a next test to be executed in a current test bundle.

6. The method according to claim 5, wherein:

if the request is for a new test bundle, determining the new test bundle to provide to a corresponding computing device based on said respective unique identifier contained in said request and downloading the new test bundle from the server for execution by the corresponding computing device; and if the request is for a next test to be executed in a current test bundle, determining the next test based on said respective unique identifier contained in said request and providing information to the corresponding computing device of the next test to be executed in the current test bundle.

7. The method according to claim 1, wherein assigning said respective unique identifier comprises receiving an initial request from each of said computing devices to download one of said test programs, and assigning said respective unique identifier in response to said initial request.

8. A computer software product, comprising a computer-readable storage medium in which computer program instructions are stored, which instructions, when read by a computer, cause the computer to perform a method for testing computing devices, the method_comprising:

accessing a suite of test programs stored therein for execution by a plurality of said computing devices that are coupled to said computer;

receiving requests at said computer from said computing devices requesting said computer to provide test programs to said computing devices;

assigning a respective unique identifier to each of said computing devices, for use in communicating with said computer;

downloading said test programs from said computer for execution by said computing devices coupled thereto, so that at least first and second computing devices among said plurality execute different first and second test programs from said suite substantially simultaneously;

receiving requests from said computing devices with respect to said execution of said test programs to determine a next test to execute at each of the computing devices, wherein each of said requests contains said respective unique identifier; and controlling said execution of at least said first and second test programs in said suite.

9. The computer software product according to claim 8, wherein said computing devices comprise MIDP-compliant devices, and wherein said test programs comprise MIDlets, which are packaged in respective JAD files and JAR files, and wherein downloading said test programs comprises downloading said JAD files and said JAR files to said MIDP-compliant devices.

10. The computer software product according to claim 9, wherein downloading said test programs further comprises the steps of downloading said JAD files to said MIDP-compliant devices, and thereafter, responsively to evaluation messages received at said computer from said MIDP-compliant devices, downloading said JAR files to said MIDP-compliant devices.

11. The computer software product according to claim 8, wherein said controlling the execution of said test programs includes said computer making a selection, based on said respective unique identifier contained in said requests, of said next test to execute on each of said computing devices, and sending responses to said computing devices indicating said selection.

12. The computer software product according to claim 8, wherein the method for testing computing devices further comprises determining for each of the requests received at said server from said computing devices whether a received request is a request for the server to determine a new test bundle or a request for the server to determine a next test to be executed in a current test bundle.

13. The computer software product according to claim 12, wherein:

if the request is for a new test bundle, determining the new test bundle to provide to a corresponding computing device based on said respective unique identifier contained in said request and downloading the new test bundle from the server for execution by the corresponding computing device; and if the request is for a next test to be executed in a current test bundle, determining the next test based on said respective unique identifier contained in said request and providing information to the corresponding computing device of the next test to be executed in the current test bundle.

14. The computer software product according to claim 8, wherein assigning said respective unique identifier comprises receiving an initial request from each of said computing devices to download one of said test programs, and said computer assigning said respective unique identifier in response to said initial request.

15. A server for testing computing devices, comprising:
   a communication interface for coupling a plurality of said computing devices thereto for use in communicating with said server; and
   a processor configured to provide a suite of test programs for execution by said computing devices that are coupled to said server;
   wherein said processor is configured to receive requests from said computing devices requesting said server to provide test programs to said computing devices;
   wherein said processor is configured to assign a respective unique identifier to each of said computing devices, for use in communicating with said server;
   wherein said processor is configured to download said test programs via said communication interface for execution by said computing devices coupled thereto, so that at least first and second computing devices among said plurality execute different first and second test programs from said suite substantially simultaneously;
   wherein said processor is further configured to receive requests via said communication interface from said computing devices with respect to said execution of said test programs to determine a next test to execute at each of the computing devices, wherein each of said requests contains said respective unique identifier; and
   wherein said processor is configured to control said execution of said test programs in said suite.

16. The server according to claim 15, wherein said computing devices comprise MIDP-compliant devices, and
   wherein said test programs comprise MIDlets, which are packaged in respective JAD and JAR files, and
   wherein said test programs are downloaded as said JAD and JAR files to said MIDP-compliant devices.

17. The server according to claim 15, wherein said processor is configured to control said execution of said test programs by making a selection, based on said respective unique identifier contained in said requests, of said next test to execute on each of said computing devices, and sending responses to said computing devices indicating said selection.

18. The server according to claim 15, wherein each of at least a subset of said test programs comprises a bundle of tests, wherein the processor is further configured to determine for each of the requests received at said server from said computing devices whether a received request is a request for the server to determine a new test bundle or a request for the server to determine a next test to be executed in a current test bundle, wherein:
   if the request is for a new test bundle, the processor is configured to determine the new test bundle to provide to a corresponding computing device based on said respective unique identifier contained in said request and downloading the new test bundle from the server for execution by the corresponding computing device; and
   if the request is for a next test to be executed in a current test bundle, the processor is configured to determine the next test based on said respective unique identifier contained in said request and providing information to the corresponding computing device of the next test to be executed in the current test bundle.

19. The server according to claim 15, wherein said processor is configured to control said execution of said test programs in said suite based on said received requests and said respective unique identifier included therein, wherein said processor is configured to communicate responses to said received requests via said communication interface, each of said responses being addressed to a respective one of said computing devices that is associated with said respective unique identifier.

20. The server according to claim 15, wherein said computing devices are coupled to said communication interface via a common test host, wherein an identifier of said common test host is shared by each of said computing devices, said identifier of said common test host is included in said respective unique identifier thereof.

* * * * *